(12) United States Patent
Hu et al.

(10) Patent No.: US 8,650,280 B2
(45) Date of Patent: Feb. 11, 2014

(54) MONITORING DISTRIBUTED TASK EXECUTION USING A CHAINED TEXT MESSAGING SYSTEM

(75) Inventors: Joseph Weizhen Hu, Lexington, MA (US); Blaine Carlton French, Concord, MA (US); Vinay Santurkar, Pune (IN)

(73) Assignee: Sybase, Inc., Dublin, CA (US)

( * ) Notice: Subject to any disclaimer, the term of this patent is extended or adjusted under 35 U.S.C. 154(b) by 61 days.

(21) Appl. No.: 13/338,712

(22) Filed: Dec. 28, 2011

(65) Prior Publication Data
US 2013/0173686 A1    Jul. 4, 2013

(51) Int. Cl.
*G06F 15/173*    (2006.01)

(52) U.S. Cl.
USPC .................... 709/223; 709/224; 709/203

(58) Field of Classification Search
USPC .............. 709/102, 203, 223–224, 201
See application file for complete search history.

(56) References Cited

U.S. PATENT DOCUMENTS

| 2003/0037091 A1* | 2/2003 | Nishimura et al. ........... 709/103 |
| 2003/0054765 A1* | 3/2003 | Botteck ........................... 455/41 |
| 2003/0120700 A1* | 6/2003 | Boudnik et al. .............. 709/102 |
| 2005/0132370 A1* | 6/2005 | Ambilkar et al. ............. 718/100 |
| 2005/0240931 A1* | 10/2005 | Padisetty et al. .............. 718/100 |
| 2006/0253854 A1* | 11/2006 | Elvanoglu et al. ............ 718/100 |
| 2007/0073732 A1* | 3/2007 | Kahn et al. ..................... 707/10 |

* cited by examiner

*Primary Examiner* — Philip B Tran
(74) *Attorney, Agent, or Firm* — Sterne, Kessler, Goldstein and Fox P.L.L.C.

(57) ABSTRACT

Embodiments of a system, method, and computer program product for monitoring task processing in a distributed system are provided. A task controller is provided with a task. The task controller generates a plurality of subtasks from the provided task, where each subtask includes a callback function. The subtasks are distributed for execution to multiple computing devices in the distributed system. As each subtask is executed by a computing device, the callback function is invoked, the invocation generating a message. The message includes the process and status information of the executing subtasks. The process and status information included in the message for each subtask is monitored, analyzed and aggregated, and is transmitted for a display on a client device.

20 Claims, 7 Drawing Sheets

MONITORING DISTRIBUTED TASK EXECUTION USING A CHAINED TEXT MESSAGING SYSTEM

BACKGROUND OF THE INVENTION

1. Field of the Invention

The present invention is generally related to monitoring task processing in a distributed system environment.

2. Background Art

In a distributed system, tasks are partitioned into subtasks for execution on multiple computing devices within the system. When subtasks execute on multiple computing devices, there is a need to monitor the progress of each subtask, as well as the progress of a task as a whole.

Some conventional distributed systems use external messaging systems to monitor subtasks. The external messaging systems, however, add complexity to the applications that execute subtasks in a distributed system, during, for example, application packaging, installation and deployment stages. Additionally, the external messaging systems add to the development cost when they are developed in-house or to maintenance cost when they are purchased from a third-party vendor. Those external messaging systems are typically implemented using a Simple Object Access Protocol (SOAP) in conjunction with an Extensible Markup Language (XML).

Therefore, what is needed are a system, method and computer program product for monitoring tasks in a distributed system environment that is internal to an application that executes in the distributed system.

BRIEF SUMMARY OF THE INVENTION

Embodiments of a system, method, and computer program product for monitoring task processing in a distributed system are provided. A task controller is provided with a task. The task controller generates a plurality of subtasks from the provided task, where each subtask includes a callback function. The subtasks are distributed for execution to multiple computing devices in the distributed system. As each subtask is executed by a computing device, the callback function is invoked, the invocation generating a message. The message includes the process and status information of the executing subtasks. The process and status information included in the message for each subtask is monitored, analyzed and aggregated, and is transmitted for a display on a client device.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art(s) to make and use the invention.

Figure 1:
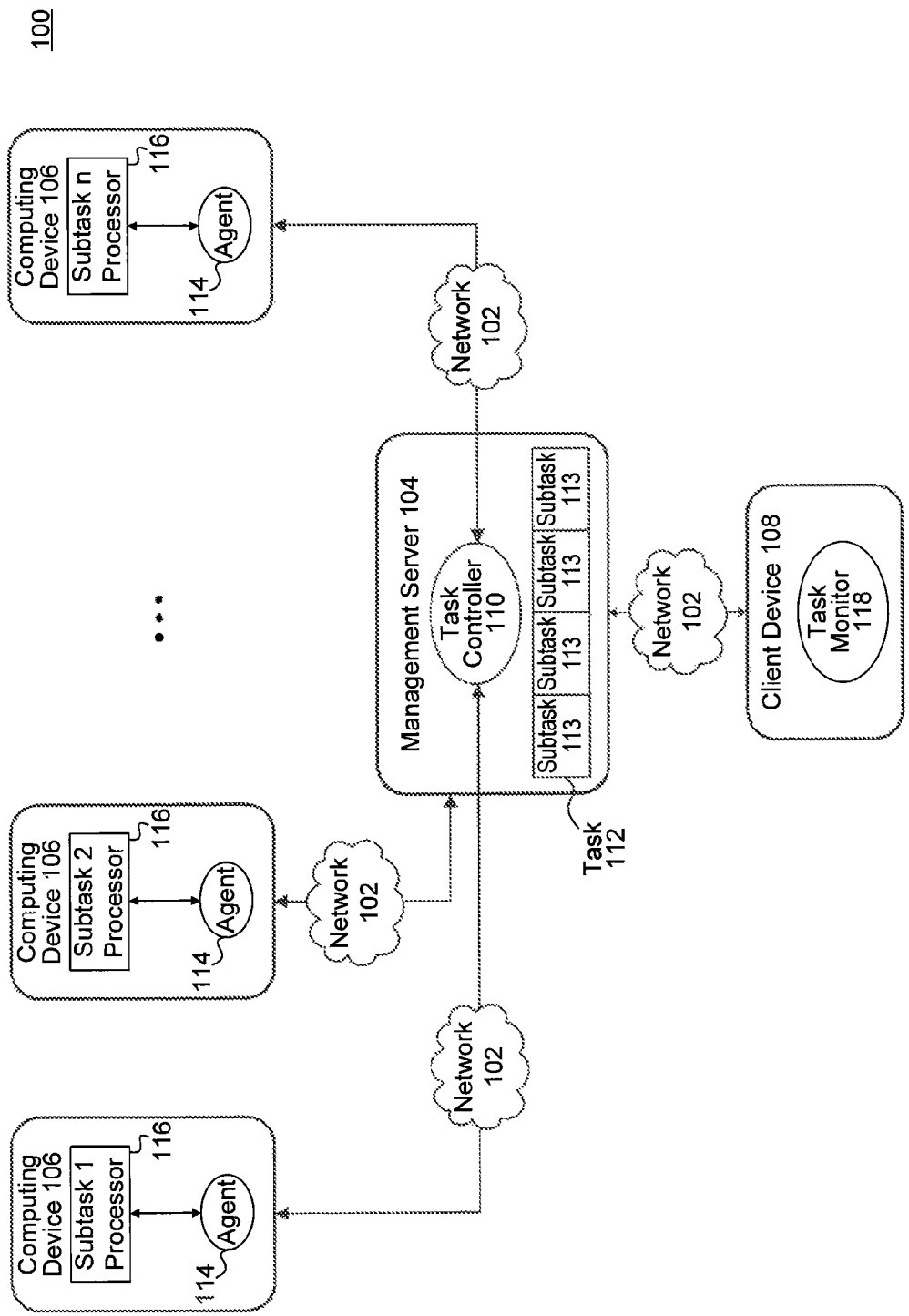
FIG. 1 is a block diagram of a distributed system environment, according to an embodiment.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The present invention is directed to the embodiments of a messaging system for monitoring tasks in a distributed system. The messaging system is internal to an application that generates tasks and subtasks. When tasks and subtask are executed in the distributed system, the messaging system uses a remote method invocation (RMI) protocol to invoke callback functions that generate and pass messages. Those messages include progress and status information for tasks and subtasks executing in the distributed system.

2. System Architecture

FIG. 1 is a block diagram of a distributed system 100, according to an embodiment. Distributed system 100 executes tasks on multiple computing devices. Distributed system 100 also monitors the progress of each task and its subtasks, as each task is being executed. Distributed system 100 includes a network 102, a management server 104, computing devices 106, and client devices 108.

Network 102 may be any network or combination of networks that carry data communication. Such a network 102 may include, but is not limited to, a local area network, metropolitan area network, and/or wide area network such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Management server 104 is a computing device that receives or generates tasks 112. Management server 104 partitions tasks 112 into multiple subtasks 113 and distributes subtasks 113 to computing devices 106 for processing. Management server 104 also manages the execution of subtasks 113 that execute on computing devices 106 throughout distributed system 100. Example management server 104 may be a Sybase Control Center for Sybase IQ from SAP AG of Weinheim, Germany, although the invention is not limited to this example implementation.

Task 112 may be any computerized job that distributed system 100 implements or processes. Example tasks 112 create databases, back up databases, upgrade configuration files, distribute applications, distribute application upgrades, etc., to computing devices 106.

Tasks 112 may be executed on one or more computing devices 106. Some tasks 112 may be executed sequentially on a single computing device 106. Other tasks 112 may also be executed sequentially or in parallel on multiple computing devices 106. For example, when task 112 includes independent components that may be executed in parallel, task 112 may be divided into subtasks 113 that execute concurrently on multiple computing devices 106.

To manage task 112 execution, management server 104 includes a task controller 110. Task controller 110 is a module or an application that executes on, or communicates with, management server 104 using network 102. Although in FIG. 1, task controller 110 is included in management server 104, the present invention is not limited to this embodiment. Task controller 110 controls the execution of each task 112 in distributed system 110. When task controller 110 determines that task 112 may be executed on multiple computing devices 106, task controller 110 partitions task 112 into multiple subtasks 113 and distributes each subtask to computing device 106. Each subtask 113 may be executed sequentially or in parallel on the respective computing device 106.

In an embodiment, task controller 110 also receives, analyzes and transmits progress and status information for tasks 112. Task controller 110 receives progress and status information that is generated by computing devices 106 as they process each subtask 113. Task controller 110 analyzes the progress and status information for each subtask 113. Task controller 110 aggregates the progress and status information for subtasks 113 and generates an overall progress and status information for task 112.

Task controller 110 also transmits messages 202 that include the analyzed progress and status information for tasks 112 and subtasks 113 to task monitor 118 (described below).

Computing device 106 is an electronic device that processes tasks 112 and subtasks 113. Example computing device 106 may be a computer server, a database server, a file server, a mail server or a print server, to name only a few. Example computing device 106 may also be a computer that executes a server application. Computing device 106 may also be an electronic device manipulated by a user, such as a personal computer, a mobile device, such as a smartphone, a laptop or a tablet computer.

Computing device 106 includes a subtask agent 114. Subtask agent 114 may be an application or a module that executes subtasks 113. In a non-limiting embodiment, example subtask agent 114 may be a JAVA application that implements remote procedure calls, using, for example, a remote method invocation (RMI) protocol. A person skilled in the art will appreciate that an RMI protocol allows a remote execution of methods in a distributed system 100, using, for example, callback functions.

When subtask agent 114 receives subtask 113 from management server 104, subtask agent 114 generates a subtask processor 116. Subtask processor 116 processes the received subtask 113 on computing device 106. When subtask 113 generates a message to management server 104 or to another subtask 113 that executes on the same or different computing device 106, subtask processor 116 transmits the message to subtask agent 114. Example messages include the input/output (I/O) messages, error messages, and subtask 113 progress and status information messages, to name a few.

In an embodiment, subtask agent 114 transmits messages that include progress and status information to task controller 110. When task controller 110 receives messages from subtask agent 114, task controller 110 analyzes, aggregates and compiles the messages, and also transmits messages for display on client devices 108.

Client device 108 is a computing device manipulated by a user. Example client device 108 includes a desktop computer, a laptop, a mobile device, such as a mobile phone, a tablet or a smartphone, to name only a few. Client device 108 includes task monitor 118. Task monitor 118 may create task 112 and transmit task 112 for processing to task controller 110. Task monitor 118 also listens to messages that task controller 110 transmits to client devices 108. In an embodiment, task controller 110 receives a subscription message from client devices 108. Subscription message identifies the messages that task controller 110 transmits to a particular client devices 108. For example, client device 108 may subscribe to receive messages on a particular message channel. In another example, client device 108 may subscribe to receive messages that provide progress and status information for particular tasks 112, or for subtasks 113 that execute on a particular set of computing devices 106.

Example messages 202 that task monitor 118 receives from task controller 110 include task 112 and subtask 113 progress and status information. When task monitor 118 receives messages for tasks 112 and subtasks 113, task monitor 118 analyzes the progress and status information included in the messages and displays the information on a display screen of client device 108. In an embodiment, task monitor 118 displays a list of subtasks 113 as they are being executed on computing devices 106, and the status and progress information for each phase of the execution. In another embodiment, task monitor 118 displays the overall progress of each task 112. In another embodiment, task monitor 118 displays the contents of the message that it receives from task controller 110.

3. Task and Subtask Message Format

Figure 2:
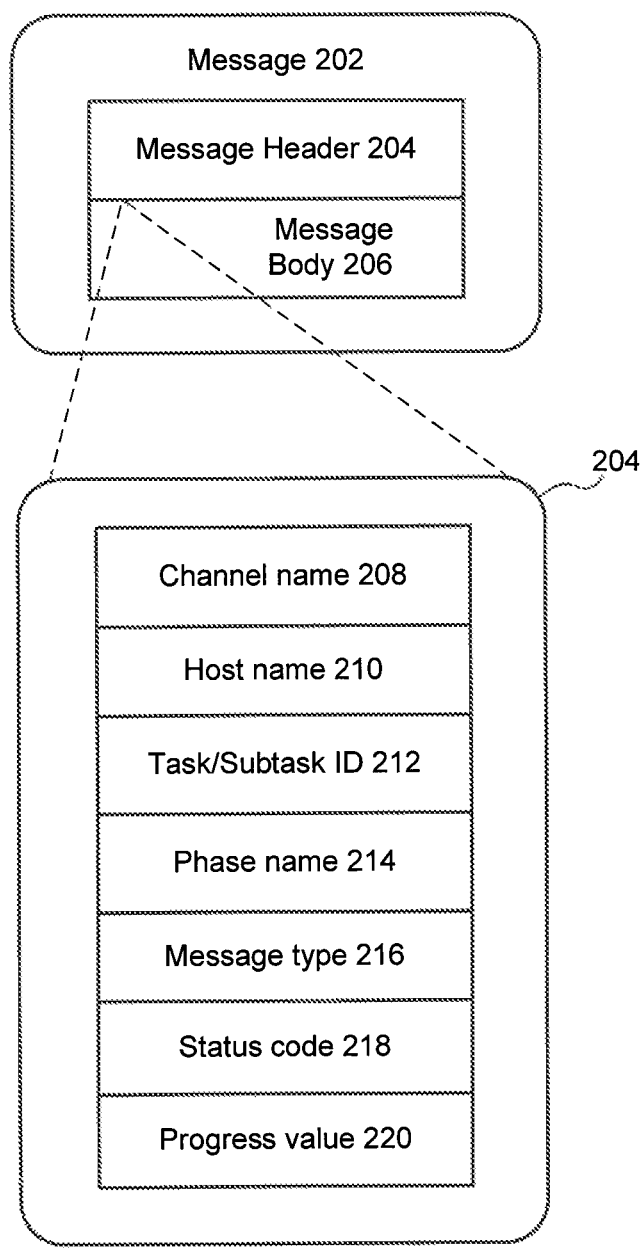
FIG. 2 is a block diagram of an exemplary message for transmitting progress and status information, according to an embodiment.

FIG. 2 is block diagram 200 of an exemplary message for transmitting progress and status information, according to an embodiment. Message 202 is an exemplary and non-limiting message that includes progress and status information for tasks 112 and subtasks 113. For example, subtask agent 114 transmits message 202, which includes progress and status information for subtask 113 executing on computing device 106 to task monitor 110. Message 202 may also be transmitted from task controller 110 to client device(s) 108. Message 202 may be a plaintext message, although message 202 is not limited to this embodiment.

Message 202 includes a message header 204 and a message body 206. Message header 204 may include multiple fields. Example fields include a channel name 208, a host name 210, a task or a subtask identifier (ID) 212, a phase name 214, a message type 216, a status code 218, and a progress value 220.

Channel name 208 includes a name of the message channel. The message channel routes messages 202 for particular tasks 112 or subtasks 213 to, for example, a subscribed task controller 110 or task monitor 118. Typically, channel name 208 may be included in message 202 by subtask agent 114 or task controller 110. Task monitor 118 may subscribe to messages 202 having a particular channel name. A person skilled in the art will appreciate that multiple tasks 212 may include the same channel name 208, thus allowing task monitor 118 to receive progress and status information for multiple tasks 112 and subtasks 113.

Host name 210 is a name of computing device 106 that executes tasks 112 or subtasks 113.

Task/subtask identifier 212 identifies task 112 or subtask 113 that executes on computing devices 106. In an embodiment, management server 104 determines task or subtask identifier 212 before distributing tasks 112 or subtasks 113 to computing device 106 for execution. An example subtask 112 identifier may be a name of a server on computing device 106.

Phase name 214 identifies the execution phase of task 112 or subtask 113. In an embodiment, phase name 214 may depend on a type of task 112 or subtask 113. Phase name 214 may be assigned to task 112 or subtask 113 from a list of phase names 214 that are preconfigured by, for example a system administrator. The list of phase names may be distributed and stored on a computing device 106 and accessible to subtask agent 114 or management server 104. In an embodiment, a special phase name of OVERALL_PHASE may be included in phase name 214 that holds a value of the overall task 112 execution status.

Message type 216 identifies a type of a message. Example values for message type 216 may include MESSAGE, STATUS, and PROGRESS. For example, when message type 216 is of type STATUS, message 202 may include the status of a particular phase of subtask 113. In another example, message type 216 of type PROGRESS may include the progress of task 112. In another example, message type 216 of type MESSAGE may include information that does not describe either the progress or status of task 112 or subtask 113, but includes information that is required for task 112 or subtask 113 execution.

Status code 218 identifies the status of each task 112 or subtask 113 as it is being executed on computing devices 106. Example status code 218 values may store values IN_PROGRESS when task 112 or subtask 113 is being executed, COMPLETE_SUCCEEDED when task 112 or subtask 113 successfully completes execution, COMPLETE_FAILED when task 112 or subtask 113 fails to complete execution, and COMPLETE_PARTIALLY_SUCCEEDED when task 112 or subtask 113 partially completes execution. In an embodiment, status code 218 may be generated when task 112 or subtask 113 enter a different execution phase.

Progress value 220 indicates a progress of task 112 or subtask 113 as it is being executed on computing device 106. In an embodiment, progress value 220 may be an integer value in a predefined integer range. Task controller 110 may use progress value 220 to determine the progress of task 112 or subtask 113 in distributed system 100.

Message body 206 of message 202 may include information and variables that are specific to task 112 or subtask 113. In an embodiment, message body 206 may include fields. Each field may include specific information about task 112 and/or subtask 113, such as, the execution path on computing device 106, configuration parameters, network parameters, etc., to name only a few.

4. Determining Task and Subtask Progress and Status Information

When task monitor 118 on client device 108 receives messages 202, task monitor 118 displays the progress and status information of each task 112 or subtask 113 from message 202. For example, task monitor 118 parses message 202 and extracts the information from message header 204, described above. Task monitor 118 then displays the extracted information of task 112 and subtask 113 on display screen.

Subtask agent 114 generates message 202 that includes subtask 113 progress and status information. As described herein, the progress and status information for each subtask 113 are also stored in message header 204. Subtask agent 114 includes a name of the phase of subtask 113 in phase name 214 field in message header 204. As described herein, a system administrator may configure a list of phase names for a particular task 112 or subtask 113 in a configuration file that subtask agent 114 may retrieve and reference on computing device 106.

Subtask agent 114 includes a value for progress value 220 that identifies the progress of subtask 113 as it is being executed by subtask processor 116. In an embodiment, progress value 220 is associated with phase name 214, and is also stored in a configuration file accessible on computing device 106. As described above, progress value 220 for each subtask 113 may be an integer within a predefined range.

Based on progress value 220, subtask agent 114 determines the progress of subtask 113. The progress of subtask 113 may be based on the percentage of subtask 113 that has completed execution. The percentage may be based on progress value 220 and its position within the range of the progress values 220. For example, when progress value 220 is an integer "i" where 1≤"i"≤"m", in the range of "1" through "m", where "m" is the largest value for progress value 220, the progress percentage may be calculated as:

progress value/largest progress value*100

A person skilled in the art will appreciate that in an embodiment, where the progress range does not start at "1", the formula above may be adjusted to calculate the progress percentage for a subtask 113 having a particular progress value 220.

In an embodiment, the value of "m" may be determined by identifying a number of phases that subtask 113 enters as it is being executed on computing device 106 and the number of steps included in each phase. In an embodiment, a value of "m" may be a sum of the steps included in each phase that processes subtask 113, such as:

m=number of phases×number of steps in each phase

For example, if subtask 113 includes five phases, such as "P1", "P2", "P3", "P4" and "P5", and each phase included 6 steps, the value for "m" may be 30. In another embodiment, where odd phases include 3 steps and even phases include 5 steps, the value of "m" may be 19.

A person skilled in the art will appreciate that the example for determining the progress for subtask 113 is given by way of example and not limitation, and that other methods for determining progress information may be used.

Once subtask agent 114 determines subtask 113 progress information, subtask agent 114 uses an RMI object to transmit message 202 to task controller 110. Upon receipt, task controller 110 identifies client device 108 that subscribes to messages 202 for task 112 and subtask 113. For example, task controller 110 may extract channel name 208 from message header 204 and identify client device(s) 108 that have subscribed to channel name 208. When task controller 110 identifies client device(s) 108, task controller 110 uses an RMI object to transmit message 202 to task monitor(s) 118 on client device(s) 108.

In an embodiment, task controller 110 generates message 202 that includes task 112 progress information. Task controller 110 includes progress information about a particular task 112 in message header 204. In an embodiment, task controller 110 sets phase name 214 to OVERALL_PHASE that indicates that message 202 includes progress information for task 112. Task controller 110 calculates the progress of each task 112 based on the number of completed subtasks 113 and the number of total subtasks 113 that task controller 110 generated for a particular task 112. For example, when task controller 110 generates subtasks 113 for task 112, task controller 110 records the number of generated subtasks 113. Task controller 110 also creates a task counter for each task 112. Task controller 110 increments the task counter each time it receives message 202 from subtask agent 114 that indicates that subtask 113 associated with task 112 has completed execution. Task controller 110 then determines the progress information for task 112 as a percentage of subtasks 113 that have completed execution, as compared to the number of total subtasks 113 associated with tasks 112. In an embodiment, task controller 110 calculates the percentage of task 112 as:

number of completed subtasks tasks/number of total subtasks*100

Once task controller 110 determines task 112 progress information, task controller 110 includes the generated progress information in message header 204. Task controller 110 then uses an RMI object to transmit message 202 to task monitor 118.

Figure 3A:
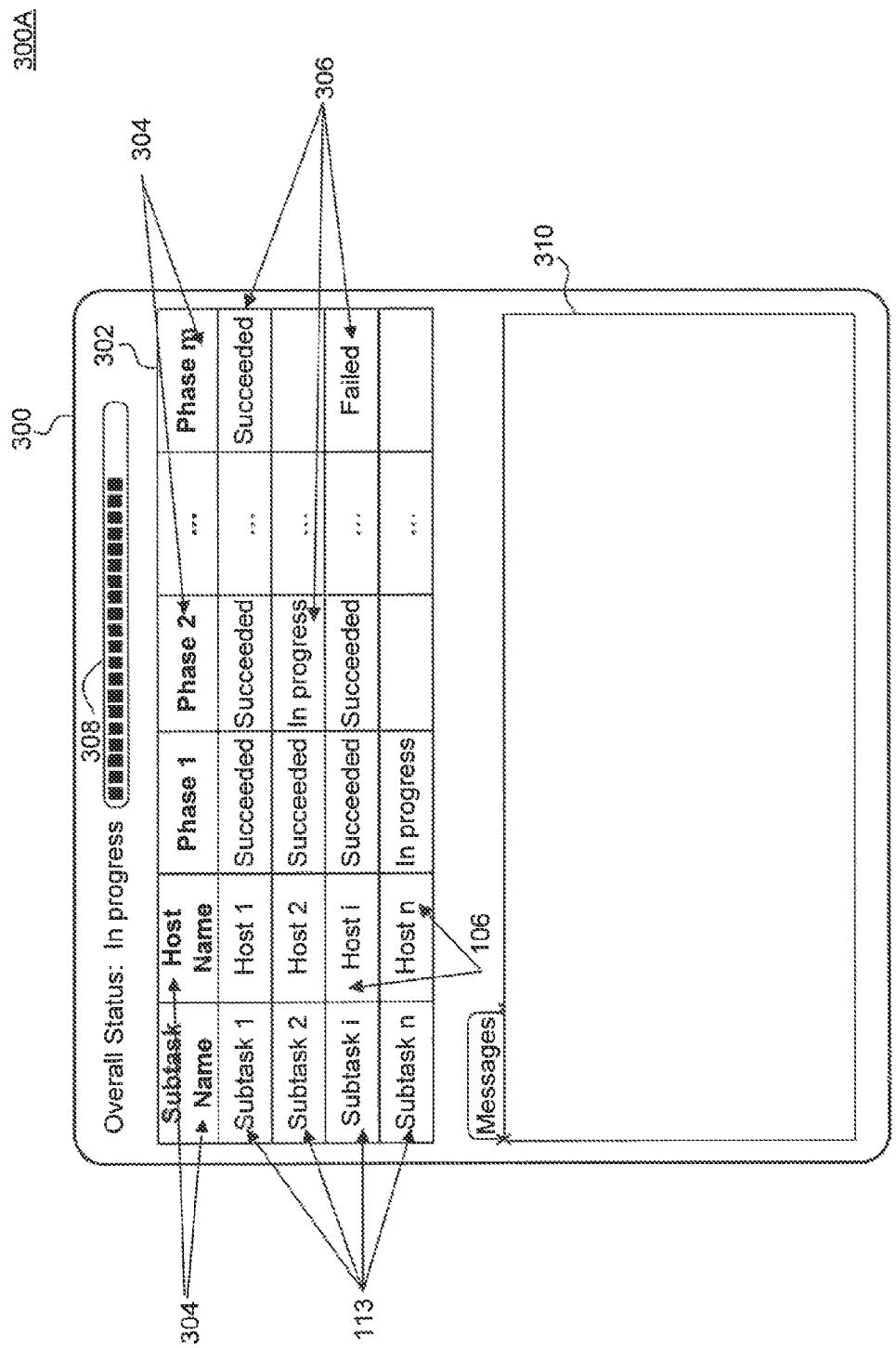
FIG. 3A is a screenshot of the task and subtask progress and status information, according to an embodiment.

FIG. 3A is a screenshot 300A of an exemplary embodiment for displaying progress and status information for a task and subtasks, according to an embodiment. When client device 108 receives messages 202 from management server 104, client device 108 passes messages 202 to task monitor 118. As described herein, task monitor 118 may subscribe to a particular message channel to receive messages 202. For example, task monitor 118 may receive messages 202 that include channel name 208 and ignore the remaining messages 202.

Task monitor 118 parses each message 202 and displays task 112 and subtask 113 information included in messages 202 in a screenshot, such as the exemplary screenshot 300A. Task monitor 118 displays the overall task 112 progress information in a task progress bar 308. As described herein, in one embodiment task progress bar 308 displays the progress of task 112 as the number of completed subtasks 113 compared to the total number of subtasks 113 that are generated for task 112.

Task monitor 118 also displays a list of subtasks 113 that are being processed on computing devices 106, the phase name for each subtask 113 and the progress of each subtask 113. For example, screenshot 300A includes an example subtask table 302. The top row of subtask table 302 includes column headings 304, such as "subtask name", "host name," and a listing of phase names, such as, for example, "phase 1," "phase 2," and "phase n."

In an embodiment, heading "subtask name" identifies a column that includes subtasks 113, where each subtask 113 may be identified by subtask identifier 212 included in message header 204. In another embodiment, heading "host" includes the name of computing device 106. In another embodiment, the headings that include the phase names may be retrieved from phase name 214 in message header 204, be downloaded from computing devices 106, or retrieved from, for example, a configuration file stored on management server 104. The status of the phase, displayed in boxes 306, corresponds to the phase of subtask 113 and may be retrieved from status code 218 in message header 204.

Task monitor 118 may also display fields in message body 206 of message 202. For example, screenshot box 300A includes a message textbox 310. Message textbox 310 may display some or all fields in message body 206.

As task monitor 118 receives messages 202 from, for example, task controller 110, task monitor 118 may dynamically update progress and status information for tasks 112 and subtasks 113 that are displayed on client device 108.

Figure 3B:
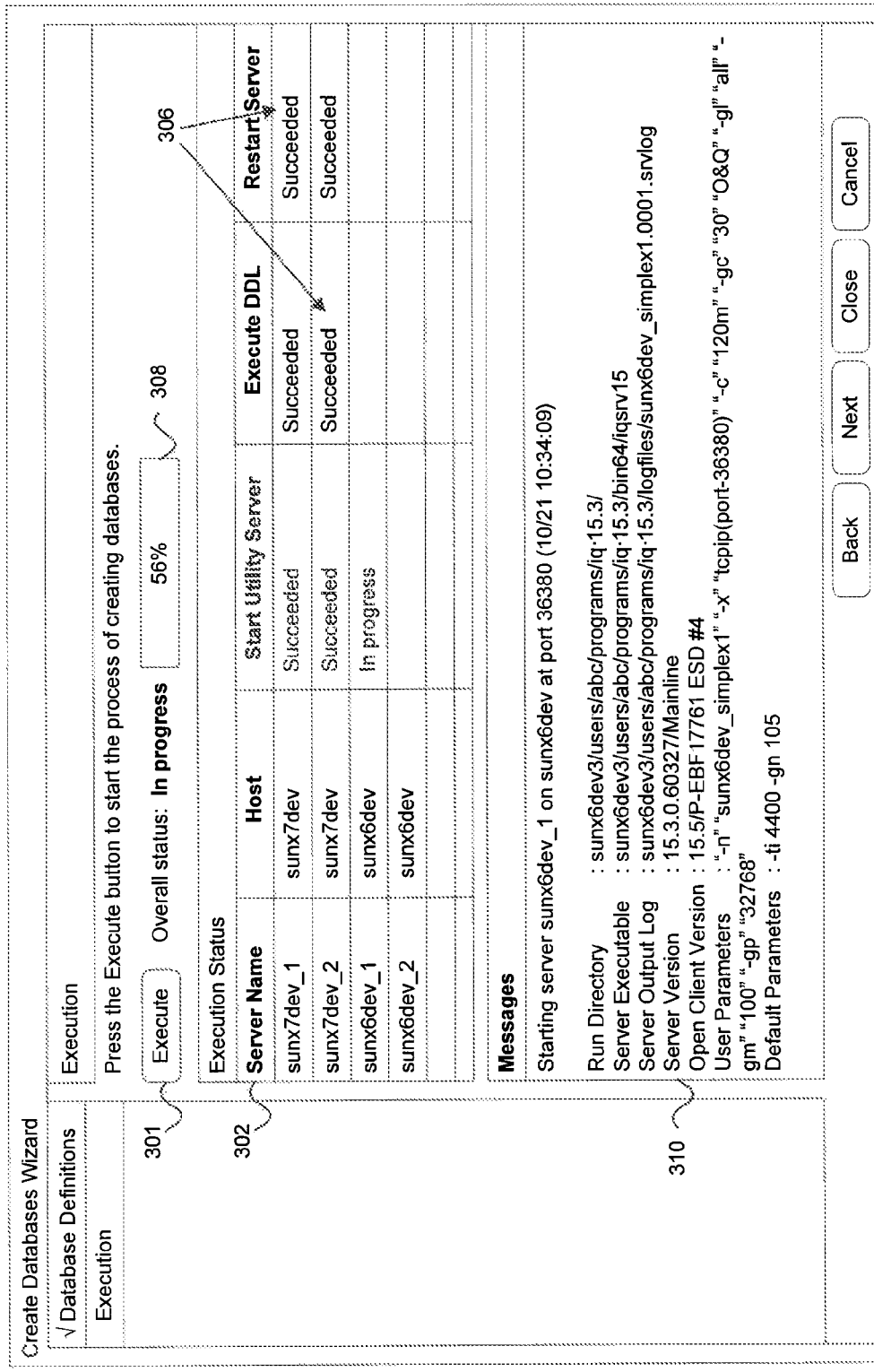
FIG. 3B is a screenshot of the task and subtask progress and status information for a task that creates multiple databases, according to an embodiment.

FIG. 3B is screenshot 300B for monitoring a task that creates databases in a distributed system as displayed on a client device, according to an embodiment.

For example, management server 104 receives task 112 that creates a number of databases on a set of computing devices 106. Upon receipt, management server 104 creates multiple subtasks 113, where each subtask 113 creates a database on a particular computing device 106. Management server 104 then transmits each subtask 113 to computing device 106.

In another embodiment, management server 104 may receive an indication from a system administrator to create databases on computing devices 106. For example, a system administrator using client device 108 may press an "Execute" button 301 on a user interface to initiate the database creation task. When client device 108 receives an indication from a user to create database task, client device 108 transmits the task to management server 104.

On computing device 106 subtask agent 114 receives each subtask 113 and generates subtask processor 116 for creating a database. Subtask processor 116 creates a database on each computing device 106. Subtask agent 114 also accesses a configuration file on client device 108 and determines that the database creation process includes three phases, such as, "Start Utility Server," "Execute DDL," and "Restart Server," though the embodiment of the invention are not limited to those phases.

Subtask agent 114 may generate messages 202 that transmit subtask 113 progress information to task controller 110. F or example, messages 202 may relay the names of three phases in field phase name 214 and names of computing devices 106 that process subtask 113, and in field host name 210. Task controller 110 may propagate messages 202 to task monitor 118.

Upon receipt of messages 202 from task controller 110, task monitor 118 parses message 202 and populates subtask table 302. For example, task monitor 118 retrieves phase name 214 from messages 202 and populates the listing of phase names in column heading 304 to include phases "Start Utility Server", "Execute DDL" and "Restart Server," as displayed in screen shot 300B.

As subtask processors 116 on computing devices 106 generate a new database, subtask agent 114 transmits messages 202 to task controller 110. For example, each time subtask processor 116 enters a new phase in creating a database, subtask agent 114 generates and transmits message 202 to task controller 110. Task controller 110 propagates messages 202 received from subtask agents 114 to task monitor 118. When task monitor 118 receives messages 202 from task controller 110, task monitor 118 parses messages 202 and displays the contents of each message 202 as an exemplary screen shot 300B.

For example, table 302 in screenshot 300B displays the progress and status information of each subtask 113 that executes on computing devices 106. In an embodiment, the name of the subtask 113 may correspond to the name of a server that executes on computing device 106, such as "sunx7dev_1," "sunx7dev_2," "sunx6dev_1," and "sunx6dev_2" in screenshot 300B. As displayed in screenshot 300B, subtask processors 116 on computing devices "surix7dev_1" and "sunx7dev_2" have created a new database, as phases "Start Utility Server", "Execute DDL" and "Restart Server" have been successfully completed. As further displayed in screenshot 300B, subtask processor 116 associated with subtask "sunx6dev_1" began executing the "Start Utility Server" phase of the database creation process. Also, as displayed in screenshot 300B, subtask processor 116 associated with subtask "sunx6dev_2" has not yet began the execution.

Task controller 110 also calculates the progress of task 112 that creates databases on computing devices 106. The progress of task 112 is displayed in task progress bar 308, in an embodiment. For example, when task controller 110 receives messages 202 from subtask agents 114 that identify the progress for creating a database on each computing device 106, task controller 110 parses message header 204 and calculates the progress of the overall task, as described above. Task controller 110 then generates message 202 that includes the progress information for task 112 and transmits message 202 for display using task monitor 118.

When task monitor 118 receives message 202 from task controller 110, task monitor 118 parses message 202. Once parsed, task monitor 118 displays the progress information for task 112 on the display screen of client device 108. For example, in screenshot 300B, task monitor 118 displays the progress of task 112 in task progress bar 308 as 56%.

In an embodiment, when task monitor 118 receives message 202, task monitor 118 also displays fields in message body 206, as demonstrated in message text box 310 in screenshot 300B. Example data in message body 206 may include the runtime directory on computing device 106, a version of a server where subtask agent 114 creates a new database, network parameters, etc., as demonstrated in the exemplary screenshot 300B.

5. Message Chaining

Unlike conventional task monitoring systems that include an external task messaging system to monitor tasks, the embodiments of the present invention include a messaging system internal to the application.

In an embodiment, distributed system 100 implements a messaging system that monitors progress and status information for tasks 112 and subtasks 113 using an RMI protocol that implements message chaining. In an RMI protocol, a first computing device creates an RMI object which may be executed on a remote computing device and calls a callback function on the first computing device.

In distributed system 100, subtask agent 114 receives RMI objects associated with task controller 110, and task controller 110 receives RMI objects associated with task monitor 118. As subtask agent 114 processes subtask 113, subtask agent 114 uses the RMI object to invoke a callback function on task controller 110. During the invocation, subtask agent 114 transmits message 202 from subtask agent 114 to task controller 110. As task controller 110 processes messages 202 that includes subtask 113 process and status information, and also determines task 112 progress and status information, task controller 110 uses the RMI object from task monitor 118 to invoke the task monitor's 118 callback function. When the invocation occurs, task controller 110 transmits message 202 that includes task 112 and subtask 113 progress and status information to task monitor 118.

Example RMI objects and callback functions may be implemented using a programming language, such as Java, that includes built-in features that support an RMI protocol.

For example, to implement the RMI protocol between task controller 110 and subtask agents 114, task controller 110 creates RMI objects for subtasks 113. Those RMI objects are exported to computing devices 106 as part of the instructions for processing subtasks 113. As subtask processors 116 executes subtasks 113, the RMI objects invoke task controller's 110 callback function and transmits messages 202.

For example, when task controller 110 creates subtasks 113 from "create database" task, task controller 110 creates RMI objects that are exported to subtask agents 114. Example non-limiting source code for creating an RMI object using Java programming language is below:

```
// create remote process listeners
procResponseListener = new ProcessResponseListenerAdapter
    (initiatingMBean, message Channel);
procStatusChangeListener = new ProcessStatusChangeListenerAdapter
    (initiatingMBean, messageChannel);
```

In an embodiment, when task controller 110 creates an RMI object, task controller 110 also includes a message channel that subtask agent 114 uses to transmit messages 202 back to task controller 110, as demonstrated in the source code above. A person skilled in the art will appreciate, however, that task controller 110 may include the message channel in an RMI object after the RMI object is created. Alternatively, subtask agent 114 may associate a message channel with RMI object on computing device 106.

After task controller 110 creates an RMI object, task controller 110 exports the RMI object to subtask agents 114 on computing devices 106. For example, task controller 110 exports the RMI objects "procResponseListener" and "procStatusChangeListener" to computing devices 106, using the example non-limiting code below:

```
// export remote process listeners
try{
    UnicastRemoteObject.exportObject(procResponseListener);
    UnicastRemoteObject.exportObject(procStatusChangeListener);
}catch(RemoteException e){
    if(log.isDebugEnabled( )){
        log.error(e.getMessage( ), e);
    }else{
        log.error(e.getMessage( ));
    }
}
```

A person skilled in the art will appreciate that in the code above, Java programming language uses a "UnicastRemoteObject" class to export RMI objects.

Task controller 110 then distributes subtasks 113 to computing devices 106. In this embodiment, each subtask 113 creates a database on computing device 106. To create a database, task controller 110 invokes an RMI method "createDatabase" on each subtask agent 114. IP the RMI method, "createDatabase", task controller 110 passes the RMI objects "procResponseListener" and "procStatusChangeListener", described above. Example RMI method that task controller 110 uses to create a database on computing device 106 is below:

```
        // calling subtask agent method
        ProcessInfo pi = APUtils.createDatabase(
            nodeSpec.agentConnInfoMap,
            nodeSpec.dbPath,
            nodeSpec.utilityDBUser,
            new String(SdkUtils.decrypt
            (nodeSpec.getEncryptedUtilityPassword( )) ),
            nodeSpec.ConnInfoMap.get("login"),
            nodeSpec.ConnInfoMap.get("password"),
            nodeSpec.serverName,
            nodeSpec.getPort( ),
            nodeSpec.startupParams,
            nodeSpec.ignoreCase,
            nodeSpec.collation,
            nodeSpec.ncharCollation,
            nodeSpec.catalogPageSizeKB,
            nodeSpec.Path,
            nodeSpec.SizeMB,
            nodeSpec.ReserveMB,
            nodeSpec.PageSizeKB,
            nodeSpec.localTempPath,
            nodeSpec.localTempSizeMB,
            nodeSpec.localTempReserveMB,
            nodeSpec.txnLogFile,
            nodeSpec.encryptionOn,
            nodeSpec.blankPaddingOn,
            procResponseListener,
            procStatusChangeListener);
```

As demonstrated in the code above, RMI objects "procResponseListener" and "procStatusChangeListener" are included in the code of the RMI method that distributes subtasks 113 to task agents 114 for creating a database.

When subtask agent 114 receives instructions to process subtask 113, such as, for example, to create a database, subtask agent 114 executes its own "createDatabase" RMI method. The RMI method initializes subtask processor 116 to process subtask 113. Example and non-limiting definition in Java programming language for a method that creates a database on subtask agent 114 is below:

```
static com.ua.util.ProcessInfo createDatabase(
    Env Env,
    String dbPath,
    String utilityDbUser,
    String utilityDbPassword,
    String User,
    String Password,
    String serverName,
    String Port,
    String startupParams,
    boolean ignore Case,
    String collation,
    String ncharCollation,
    int catalogPageSizeKB,
    String Path,
    int SizeMB,
    int ReserveMB,
    int PageSizeKB,
    String localTempPath,
    int localTempSizeMB,
    int localTempReserveMB,
    String txnLogFile,
    boolean encryptionOn,
    com.ua.services.rshell.ProcessResponseListener
processResponseListener,
    com.ua.services.rshell.ProcessStatusChangeListener
processStatusChangeListener) throws Exception{
    ProcessResponseListenerAdapter
processResponseListenerAdapter = new
ProcessResponseListenerAdapter(processResponseListener);
    ProcessStatusChangeListenerAdapter
processStatusChangeListenerAdapter = new
ProcessStatusChangeListenerAdapter(processStatusChangeListener);
```

-continued

```
    try{
        UnicastRemoteObject.exportObject(processResponseListenerAdapter);
        UnicastRemoteObject.exportObject(processStatusChangeListenerAdapte);
    }catch(RemoteException e) {
        if(log.isDebugEnabled( )){
            log.error(e.getMessage( ), e);
        }else{
            log.error(e.getMessage( ));
        }
    }
    ProcessInfo pi = CmdLineUtils.createDatabase(
        Env,
        dbPath,
        utilityDbUser,
        utilityDbPassword,
        User,
        Password,
        serverName,
        Port,
        startupParams,
        ignore Case,
        collation,
        ncharCollation,
        catalogPageSizeKB,
        Path,
        SizeMB,
        ReserveMB,
        PageSizeKB,
        localTempPath,
        localTempSizeMB,
        localTempReserveMB,
        txnLogFile,
        encryptionOn,
        processResponseListenerAdapter,
        processStatusChangeListenerAdapter);
    com.sybase.ua.util.ProcessInfo_pi =
            convertToUAFProcessInfo(pi);
    return_pi;
```

In the source code sample above, the RMI method that subtask agent 114 executes also creates RMI objects, such as "processResponseListenerAdapter" and "processStatusChangeListenerAdapter." The RMI objects "processResponseListenerAdapter" and "processStatusChangeListenerAdapter" are passed to the "createDatabase" method that is executed by subtask agent 114 as callback parameters.

As subtask agent 114 creates a database, the RMI objects on subtask agent 114 invoke a callback function on task controller 110. The invocation generates and transmit messages 202 to task controller 110. For example, RMI object "processStatusChangeListener" may generate message 202 that includes a change in status code 218 from "IN_PROGRESS" that identifies that subtask 113 is being executed to "COMPLETE_SUCCEEDED" that identifies that subtask 113 has completed execution. In another example, RMI object "processResponseListener" may generate message 202 that includes a change in a phase through field phase name 214 and/or a change in progress value 220.

As the database is created on computing device 106, the database creation process proceeds through multiple phases. At each phase subtask agent 114 uses the RMI objects to invoke a callback function on tack controller 110 and transmits message 202 to task controller 110.

Once task controller 110 receives messages 202 from subtask agent 114, task controller 110 processes messages 202. As part of processing, task controller 110 uses the RMI objects that it received from task monitor 118 (in a manner similar to the one described above), to invoke a callback function on task monitor 118 and transmit messages 202 to task monitor 118.

A person skilled in the art will appreciate that the example above, which uses callback functions and RMI objects to implement message chaining, is given by way of example, and not limitation, and that other ways of using RMI objects and message chaining will be apparent to a person skilled in the relevant art.

Figure 4:
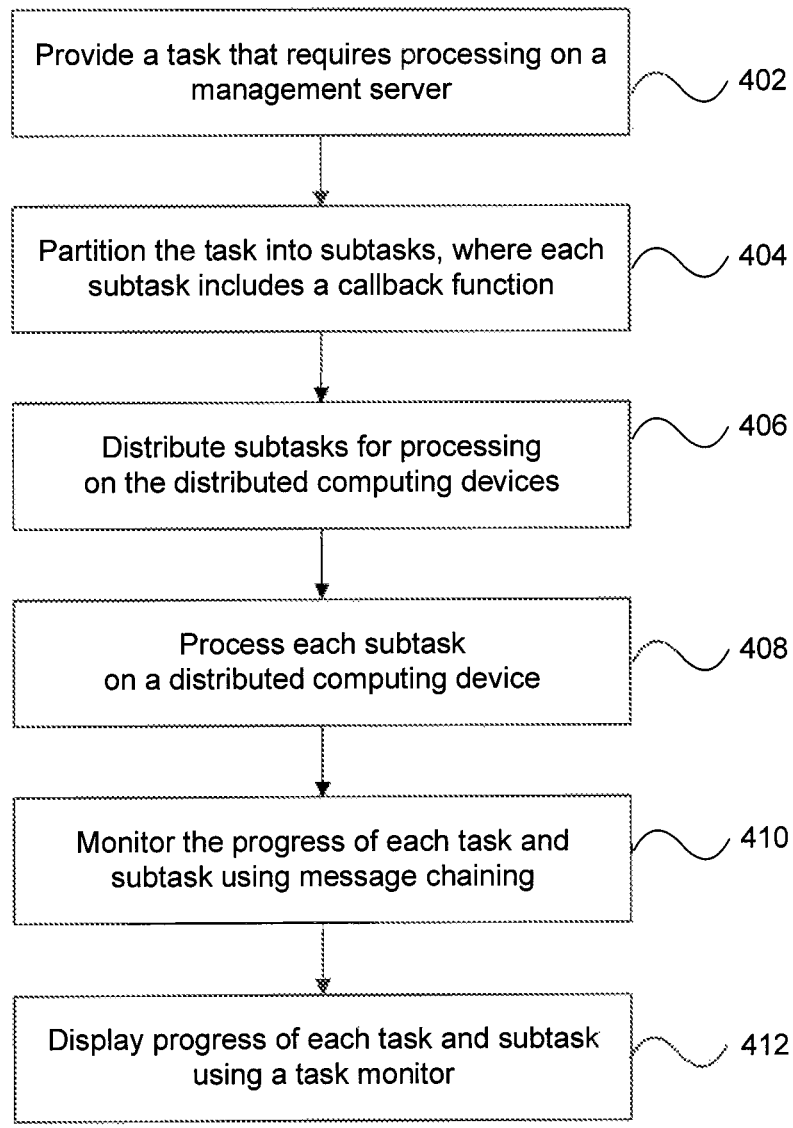
FIG. 4 is a flowchart of a method for monitoring a task, according to an embodiment.

FIG. 4 is a flowchart 400 of a method for monitoring progress and status of a task, according to an embodiment.

At step 402, a task is provided. For example, task controller 110 may receive task 112 that requires processing from task monitor 118. With task 112, task controller 110 receives and RMI object from task monitor 118 that invokes a call back function for transmitting messages from task controller 110 to task monitor 118. Example task 112 may be directed to creating a database on multiple computing devices 106.

At step 404, a task is partitioned into multiple subtasks. Task controller 110 partitions task 112 into multiple subtasks 113. As described herein, each subtask 113 may be executed on a separate computing device 106 by subtask agent 114. For example, task 112 that creates databases on multiple computing devices 106 may be separated into multiple subtasks 113, where each subtask 113 creates a database on a distinct computing device 106. When task controller 110 generates subtasks 113, task controller 110 creates an RMI object and distributes the RMI object with subtask 113 to computing devices 106.

At step 406, subtasks are distributed to computing devices. Once task controller 110 generates subtasks 113, task controller 110 distributes subtasks 113 to computing devices 106. Along with subtasks 113, task controller 110 also distributes the RMI objects that invoke call back functions on task controller 110. As described herein, this results in messages 202 being generated as each subtask 113 is being executed by a respective subtask processor 116 that was initialized by subtask agent 114.

At step 408, each subtask is processed on a computing device. For example, subtask agent 114 on computing device 106 receives each subtask 113 from task controller 110 and begins processing subtask 113.

At step 410, the progress of each task and subtask is monitored through chain messages. As subtasks 113 execute on computing devices 106 the RMI objects on subtask agent 114 invoke a callback function on task controller 110 and generate message 202 that includes subtask 113 progress and status information. For example, each time subtask processor 116 executes subtask 113 that includes several phases, subtask processor 116 may use an RMI object to trigger a callback function and generate message 202 as it enters or completes each phase. Moreover, each time subtask processor 116 executes a particular step within each phase, subtask processor 116 may also use the RMI object to trigger a callback function and generate message 202.

When task controller 110 receives messages 202 that include subtask 113 progress and status information, task controller 110 may calculate task 112 progress information, as described herein. For example, when task controller 110 receives messages 202 that include subtask 113 progress and status information, task controller 110 aggregates the progress and status information of the overall task 112 from the progress and status information for a particular subtask 113 included in message 202. Task controller 110 may then use an RMI object to invoke a callback function on task monitor 118. This results in another message 202 being generated that includes the calculated progress and status information for task 114 in message header 204. Task controller 110 then transmits message 202 to task monitor 118. In another example, task controller 110 may invoke a different callback function on task monitor 118 that causes task controller 110 to generate message 202 that includes progress and status information associated with subtask 113, and transmit the generated message to task monitor 118.

At step 412, progress and status information of task and subtask is displayed. For example, when task monitor 118 receives messages 202 using a call back function, task monitor 118 parses messages 202 and displays subtask 113 and/or task 112 progress and status information on a display screen of client device 108.

Figure 5:
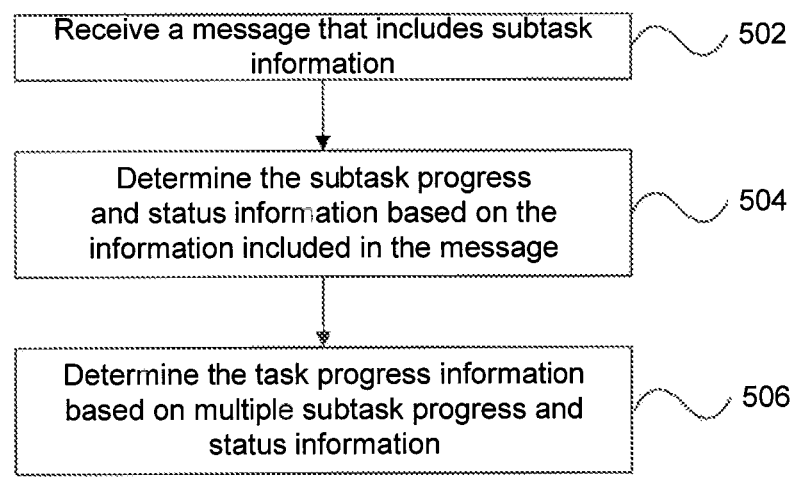
FIG. 5 is a flowchart of a method for determining progress and status information for a task and subtask, according to an embodiment.

FIG. 5 is a flowchart 500 of a method for determining status and progress information for a task and subtask, according to an embodiment.

At step 502, messages that include subtask information are received. For example, task controller 110 receives message 202 that includes subtask 113 progress and status information from subtask agent 114.

At step 504, progress and status information for a subtask is determined. As described herein, messages 202 may include the name of the phase 214, the status code 218 and the progress value 220 for each subtask 113. In another example, task controller 110 may use progress value 220 to determine the percentage of subtask 113 that has completed execution. In another embodiment, status code 218 may identify whether subtask 113 has successfully completed or has failed.

At step 506, progress information for a task is determined. For example, when task controller 110 receives messages 202 that include progress and status information of each subtask 113, task controller 110 uses the progress and status information associated with subtask 113 to determine the progress of task 112. For example, task controller 110 aggregates the information in messages 202 that include subtask 113 progress and status information and identifies which subtasks 113 have successfully completed execution on computing devices 106 or have failed to complete. Task controller 110 may also calculate a percentage of task 112 that has completed, as described herein. Once task controller 110 determines progress information for task 112, task controller 110 generates message 202 that includes task 112 progress and/or status information and transmits message 202 to task monitor 118.

6. Example Computer Implementation

Figure 6:
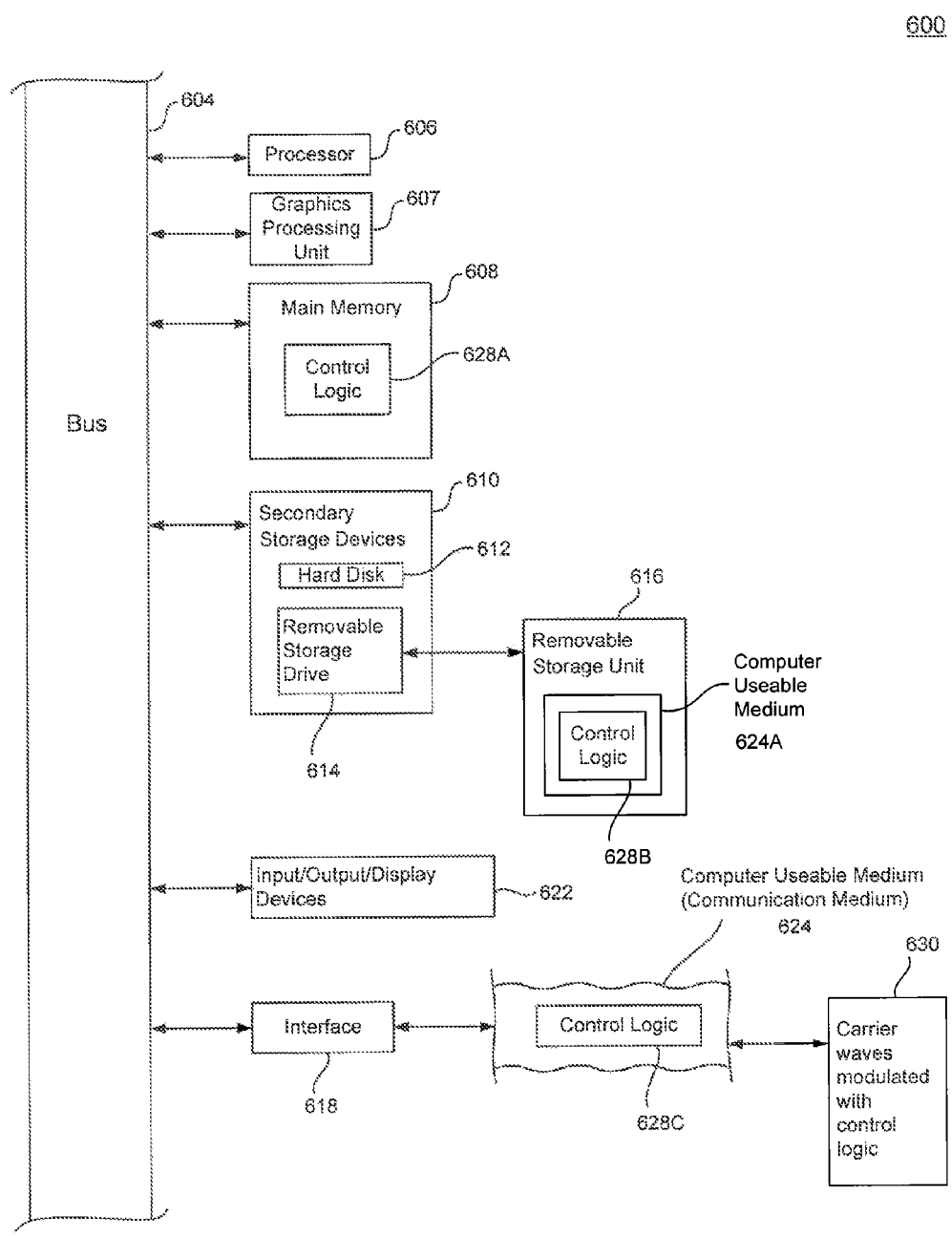
FIG. 6 illustrates an example computer system where the embodiments of the present invention may be implemented.

In an embodiment of the present invention, the system and components of the present invention described herein are implemented using well known computers, such as computer 600 shown in FIG. 6.

Computer 600 can be any commercially available and well known computer capable of performing the functions described herein, such as computers available from International Business Machines, Apple, Sun, HP, Dell, Compaq, Digital, Cray, etc.

Computer 600 includes one or more processors (also called central processing units, or CPUs), such as a processor 606. The processor 806 is connected to a communication bus 604. Processors 606 may include any conventional or special purpose processor, including, but not limited to, digital signal processor (DSP), field programmable gate array (FPGA), and application specific integrated circuit (ASIC).

Computer 600 includes one or more graphics processing units (also called GPUs), such as GPU 607. GPU 607 is a specialized processor that executes instructions and programs selected for complex graphics and mathematical operations in parallel.

Computer 600 also includes a main or primary memory 608, such as random access memory (RAM). The primary memory 608 has stored therein control logic 628A (computer software), and data.

Computer 600 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

Computer 600 also includes input/output/display devices 622, such as monitors, keyboards, pointing devices, touch-screen displays, etc.

Computer 600 further includes a communication or network interface 618. The network interface 618 enables the computer 600 to communicate with remote devices. For example, the network interface 618 allows computer 600 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from computer 600 via the communication medium 624B. More particularly, the computer 600 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 600, the main memory 608, the secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

7. Conclusion

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method for monitoring task processing in a distributed system, comprising:
    distributing a task as a plurality of subtasks to a plurality of computing devices within the distributed system for execution, wherein a respective computing device executes a subtask, the subtask including a remote method invocation (RMI) object that invokes a callback function each time the subtask enters a distinct processing phase;
    monitoring execution of the plurality of subtasks using at least one message generated by the RMI object on the respective computing device; and
    determining a progress and status information of the task based on the at least one message.

2. The method of claim 1, further comprising:
    using a callback function, transmitting the progress and status information for the plurality of subtasks for display on a client device.

3. The method of claim 1, wherein the call back function invocation is chained to another call back function for relaying the at least one message.

4. The method of claim 1, further comprising:
    invoking the callback function when a subtask in the plurality of subtasks enters a distinct processing phase.

5. The method of claim 1, wherein the at least one message includes the progress and status information in a message header.

6. The method of claim 1, wherein the monitoring further comprises:
    identifying a progress value in the at least one message, the progress value identifying a progress of a subtask; and
    determining the progress and status information based on the progress value.

7. The method of claim 6, wherein the determining the progress and status information further comprises:
    determining a progress range, wherein the progress value is included within the progress range; and
    determining a percentage that represents the progress value within the progress range.

8. The method of claim 1, further comprising:
    monitoring progress information of the task based on a combined progress and status information of each subtask in the plurality of subtasks.

9. The method of claim 8, wherein monitoring the execution of the task further comprises:
    identifying a status of each subtask in the plurality of subtasks, wherein the status of each subtask is included in a status code in the at least one message; and calculating the progress information of the task, based on the status code of each subtask.

10. The method of claim 9, wherein the calculating further comprises:
using the status code to identify a number of subtasks in the plurality of subtasks that completed execution; and
determining a ratio between the number of subtasks that completed execution and a number of subtasks in the plurality of subtasks.

11. A system for monitoring tasks processing in a distributed system, comprising:
a memory;
a processor coupled to the memory; and
a task controller stored in the memory and executing on the processor and configured to:
distribute a task as a plurality of subtasks to a plurality of computing devices within the distributed system for execution, wherein a respective computing device executes a subtask, the subtask including a remote method invocation (RMI) object that invokes a callback function each time the subtask enters a distinct processing phase;
monitor execution of the plurality of subtasks using at least one message generated by the RMI object on the respective computing device; and
determine a progress and status information of the task based on the at least one message.

12. The system of claim 11, wherein the task controller is further configured to use a callback function to transmit the progress and status information for the plurality of subtasks for display on a client device.

13. The system of claim 11, wherein the call back function invocation is chained to another call back function for transmitting the at least one message.

14. The system of claim 11, further comprising a subtask agent configured to invoke the callback function when a subtask in the plurality of subtasks enters a distinct processing phase.

15. The system of claim 11, wherein the at least one message includes the progress and status information in a message header.

16. The system of claim 11, wherein the task controller is further configured to:

identify a progress value in the at least one message, the progress value identifying a progress of a subtask; and
determine the progress and status information based on the progress value.

17. The system of claim 16, wherein the task controller is further configured to:
determine a progress range, wherein the progress value is included within the progress range; and
determine a percentage that represents the progress value within the progress range.

18. The system of claim 11, wherein the task controller is further configured to monitor progress information of the task based on a combined progress and status information of each subtask in the plurality of subtasks.

19. The system of claim 18, wherein the task controller is further configured to:
identify a status of each subtask in the plurality of subtasks, wherein the status of each subtask is included in a status code in the at least one message;
identify a number of subtasks in the plurality of subtasks that completed execution, using the use the status code; and
determine a ratio between the number of subtasks that completed execution and a number of subtasks in the plurality of subtasks to calculate the progress information of the task.

20. A non-transitory computer-readable medium, having instructions stored thereon, wherein the instructions cause a computing device to perform operations for monitoring task processing in a distributed system, the operations comprising:
distributing a task as a plurality of subtasks to a plurality of computing devices within the distributed system for execution, wherein a respective computing device executes a subtask, the subtask including a remote method invocation (RMI) object that invokes a callback function each time the subtask enters a distinct processing phase;
monitoring execution of the plurality of subtasks using at least one message generated by the RMI object on the respective computing device; and
determining a progress and status information of the task based on the at least one message.

* * * * *